Feb. 9, 1926.
J. M. DOUGHERTY
1,572,844
HEATING SYSTEM
Filed April 27, 1925
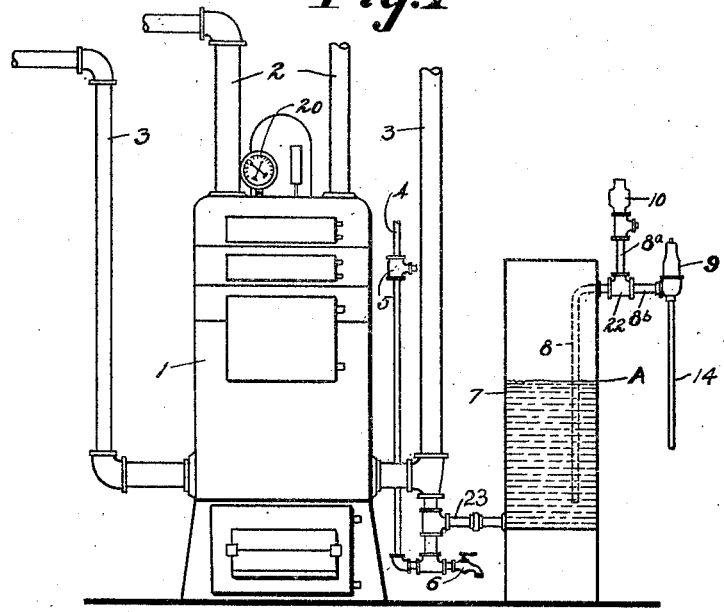
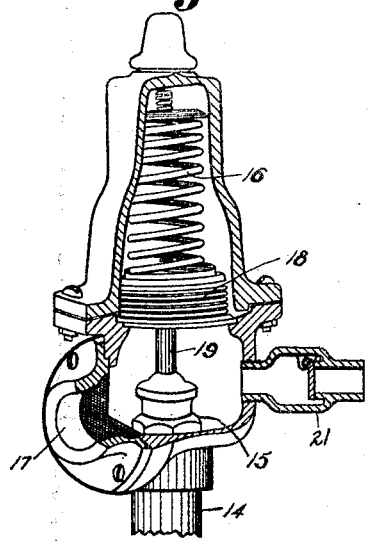
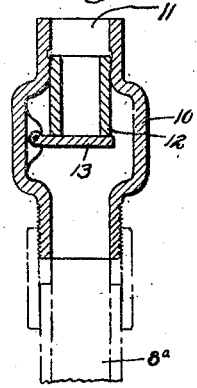
Inventor
John M. Dougherty Patented Feb. 9, 1926.

1,572,844

UNITED STATES PATENT OFFICE.

JOHN M. DOUGHERTY, OF ST. LOUIS, MISSOURI, ASSIGNOR TO D. & T. MANUFACTURING COMPANY, OF ST. LOUIS, MISSOURI, A CORPORATION OF MISSOURI.

HEATING SYSTEM.

Application filed April 27, 1925. Serial No. 26,162.

*To all whom it may concern:*

Be it known that I, JOHN M. DOUGHERTY, a citizen of the United States, residing at St. Louis, Missouri, have invented a certain new and useful Improvement in Heating Systems, of which the following is a specification such as will enable others skilled in the art to which it appertains to make and use the same.

My invention relates to closed feeding systems such as hot water plants of the type which include an expansion tank for the purpose of maintaining the circulating portion of the heating system filled with the heating liquid at all times irrespective of variations in the temperature of the liquid. This expansion tank may also be utilized for automatically regulating the drafts of the furnace for the purpose of controlling the temperature. A system of this type is indicated in Patent No. 957,601, issued to myself and H. C. Tabler on May 10, 1910.

When such systems are first filled with water, a quantity of air is trapped in the expansion tank and compressed by the water in the system, and under normal conditions about two-thirds of the tank will be filled with air and the remaining third filled with water. After extended periods of service, the quantity of air in the tank will decrease. This will be due to absorption of the air by the water and to minute leakage of air from the tank and fittings.

In order to recharge the tank with air, it has been customary to drain the system of its liquid, permitting the same to fill with air and then to refill with liquid again, trapping a quantity of air in the expansion tank as was done when the system was originally filled. This operation involves the opening of the radiator valves all over the system while the system is being drained and the subsequent closing of these valves. The operation takes considerable time while the plant is being drained and being refilled and results in the waste of water in the system.

The main object of my present invention is to simplify the operation of recharging the expansion tank with air.

Additional objects are to reduce to a minimum the necessary fittings for this type of heating system.

I accomplish my main object by so arranging the apparatus that a partial vacuum in the heating system may be created by draining a small quantity of liquid therefrom and such vacuum will automatically recharge the expansion tank with air. By opening a drain cock, a partial vacuum is easily created and by closing the drain cock and opening a liquid supply valve the slight amount of liquid withdrawn in order to create the vacuum is replaced.

In the accompanying drawings which illustrate my invention—

Figure 1 is an elevation of the essential parts of my heating system and showing an arrangement of relief and air inlet valves.

Figure 2 is a detail of the air inlet valve shown in Figure 1.

Figure 3 is a detail of the pressure relief valve shown in Figure 1 modified to include an air inlet valve.

In the drawings, the boiler is indicated at 1, the distributing pipes are shown at 2, and return pipes are indicated at 3. The system is connected to the water main by supply pipe 4 having a cock 5 and the system may be drained through cock 6.

Connected to the lower portion of the system by piping 23 is the expansion tank 7. When the system is first filled with liquid, the water level in the tank will be approximately at the line A. A pipe 8 extends from a substantial distance below the normal water level A and through the upper portion of the tank to the outside of the tank where it is connected to a liquid relief valve 9 which contains a spring closed port adapted to be opened when the pressure on the lower face of the valve rises above a predetermined point. Between the relief valve 9 and the tank, pipe 8 is connected to an air inlet check valve 10, the port of which is normally closed by the pressure in the system but will be opened by the atmospheric pressure on the outside if the pressure in the system falls below the atmosphere.

Valve 10 may be of any check valve construction but in Figure 2 I show an embodiment of a check valve consisting of a body 10 having a threaded nipple for the connection to pipe $8^a$ and a port 11 open to the atmosphere. The port is provided with a valve seat 12 against which the valve disk 13 may move when the pressure in pipe $8^a$ is greater than the atmospheric pressure.

The relief valve illustrated in Figure 3 includes a body having an outlet port connected to discharge pipe 14 and forming a seat for a disk 15 which is yieldingly held in closed position by spring 16. The valve is connected to the heating system at 17. Pressure in the lower portion of the valve chamber expands flexible diaphragm 18, the top of which is connected by a stem 19 to disk 15 and may lift the disk off its seat, permitting liquid to flow through discharge pipe 14 until the pressure is reduced to normal.

Assuming that the system has been in use for some time and that the air originally present in the upper portion of tank 7 has been absorbed by the liquid or has leaked from the tank until the tank is substantially filled with liquid, the condition will be evidenced by the action of the pressure hand on the indicator 20. A slight increase in the temperature of the water will result in a substantial movement of the black hand of the indicator due to the fact that the system is practically filled with liquid and there is no air cushion to absorb the expansion of the liquid when heated. When this condition exists, the user of the system may open drain cock 6 and drain a small quantity of liquid from the system. This quantity will vary, of course, with the size of the system and the elevation of the highest radiators, but normally the withdrawal of two or three buckets of liquid will create such partial vacuum in the system that immediately air will be drawn in through valve 10 and pipe 8 and, upon emerging from the lower end of the pipe, will rise through the liquid in the tank and will be trapped therein. After the required amount of liquid has been drained from the system (the amount to be determined by the contractor who installs the system), the user will know that sufficient air has been drawn into the tank to render the system efficient and drain cock 6 may be closed. Cock 5 is then opened to restore the desired pressure in the system as indicated by the red hand of the indicator. Cock 5 is then closed and the system is in normal condition.

All of the above air charging operations may be performed while there is fire in the boiler which is a marked advantage over the previous method of recharging expansion tanks of such systems, as it has been necessary previously to put out the fire in the boiler in order to avoid injury to the boiler due to the withdrawal of the water in the boiler. By locating the relief valve 9 and inlet valve 10 at the elevation shown, it will be impossible for the boiler to be injured by complete drainage of water by a leak in the relief valve because the water level could not fall below the relief valve.

Pipe 8ª and the separate air inlet valve 10 may be eliminated by the arrangement shown in Figure 5 in which the relief valve has the air inlet valve 21 connected with it. So long as the air inlet valve is between disk 15 and the connection to the system, the air inlet will function as described above.

It is not necessary that the relief valve and air inlet valve should have the same connection to the tank as shown. The arrangement is only a preferred one and the pressure relief valve may be located anywhere in the system and the air inlet valve may be connected to the tank independently of the relief valve.

If it is preferred not to rely upon an automatic air inlet valve, the same may be replaced by a plug let into a T 22 or into the threaded opening in the valve shown in Figure 3 as forming the inlet for the valve 21. Obviously, other modifications of the details of my invention may be made without departing from the spirit thereof as expressed in the following claims.

I claim:

1. In a closed liquid heating system, an expansion tank, a pressure relief valve located above the normal water level in said tank, a conduit between said valve and the liquid in the lower portion of said tank, and an air inlet valve connected to said conduit.

2. In a closed liquid heating system, an expansion tank containing air and liquid under super-atmospheric pressure, an excess pressure relief valve located above the normal liquid level in said tank, a conduit between said valve and the lower portion of said tank, and an air inlet valve connected to said conduit and adapted to be opened by atmospheric pressure when the pressure in said tank falls below atmospheric pressure.

3. In a closed liquid heating system, an expansion tank for containing air and water under pressure exceeding atmospheric pressure, an air inlet valve connected to said tank, a drain cock for the system connected to the lower portion of said tank, and a supply cock for connecting the system to an exterior source of liquid under pressure greater than atmospheric pressure, whereby solely by operation of said cocks said tank may be charged with air under pressure exceeding atmospheric pressure.

4. In a closed liquid heating system, a boiler having a liquid chamber, an air and water containing expansion tank located near the lower part of the system and having a normal liquid level spaced a substantial distance below the tank top, a pressure relief valve located a substantial distance above the bottom of said chamber and connected to said tank below said normal liquid level in said tank, an air inlet valve connected to said tank, a liquid outlet cock in the system below said normal liquid level in said tank, and a liquid inlet cock in the system.

5. In a closed liquid heating system, a boiler, an expansion tank connected to said boiler and located near the lower part of the system and having a normal liquid level spaced a substantial distance below the tank top, a pipe leading from a point in said tank below said liquid level to the exterior of the tank, a relief valve located above said liquid level and connected to said tank below said liquid level, an air inlet valve connected to said pipe above said liquid level, and separate liquid drainage and supply cocks for said system, said drainage cock being located below the end of said pipe which is in said tank.

6. In a closed liquid heating system, an air and water containing expansion tank in the lower portion of the system, an air inlet check valve connected to said tank, a drain cock in said system located below the normal water level in said tank, and a water supply cock for said system whereby pressure in said tank may be reduced below atmospheric pressure, by opening said drain cock, to increase the volume of air in said tank, and whereby pressure in said tank may be increased above atmospheric pressure by closing said drain cock and opening said water supply cock.

7. In a closed liquid heating system, an expansion tank having a connection between its lower portion and the remainder of the system and containing air in its upper portion and containing liquid, the air being compressed by the liquid in said system, a pipe extending from the atmosphere into said tank and terminating substantially below the normal liquid level therein, an air inlet valve and an excess pressure outlet valve connected to said pipe outside of said tank and respectively operating automatically upon abnormal departures below and above normal pressure in said tank.

In testimony whereof I hereunto affix my signature this 23rd day of April, 1925.

JOHN M. DOUGHERTY.